May 10, 1927.
C. T. WEIBLER
1,627,815
RADIO BATTERY CHARGER
Filed Nov. 24, 1926
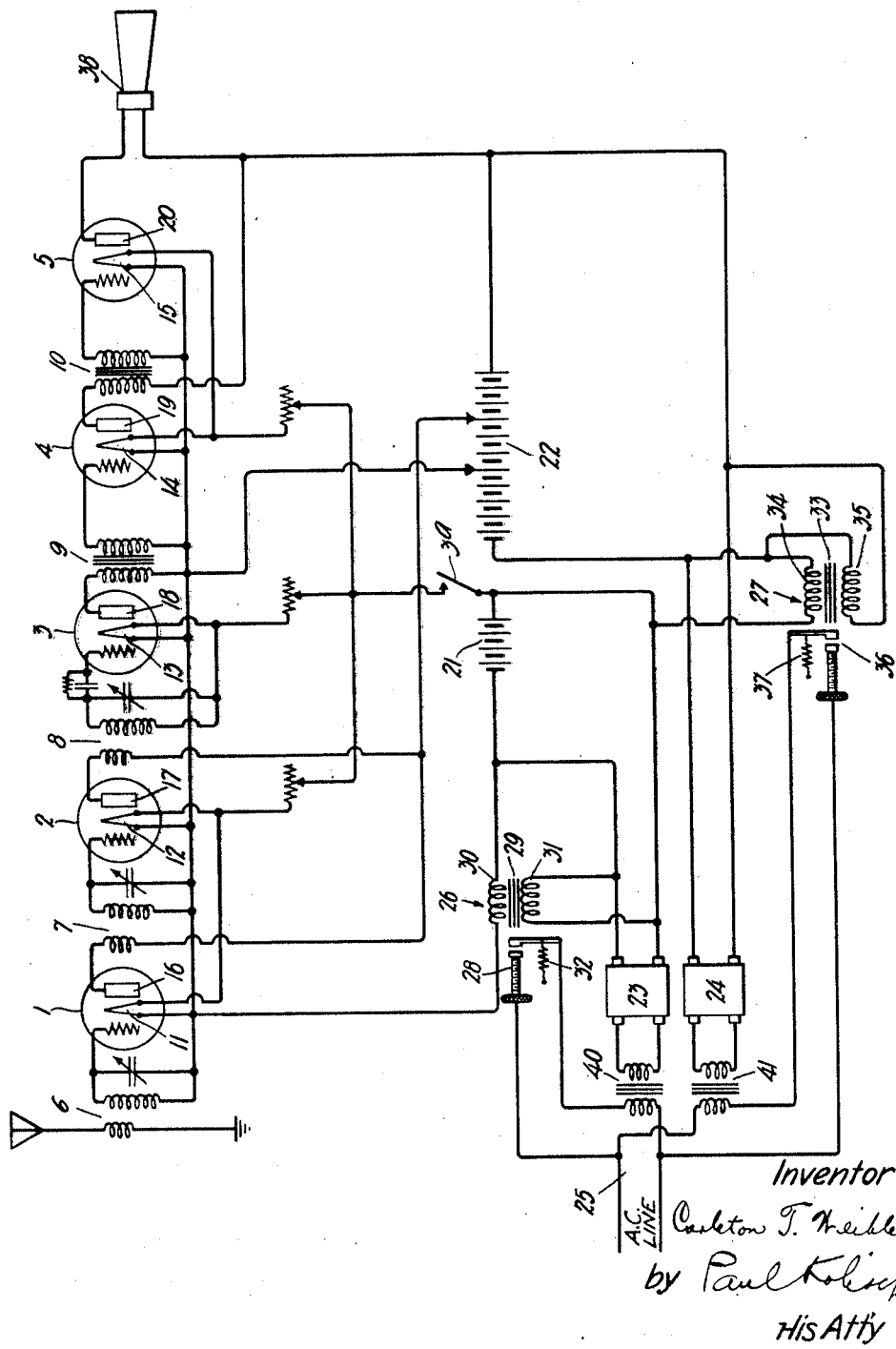
Inventor
Carleton T. Weibler
by Paul Kolisch
His Atty Patented May 10, 1927.

1,627,815

UNITED STATES PATENT OFFICE.

CARLETON T. WEIBLER, OF LA GRANGE, ILLINOIS, ASSIGNOR TO ALL-AMERICAN RADIO CORPORATION, OF CHICAGO, ILLINOIS, A CORPORATION OF ILLINOIS.

RADIO BATTERY CHARGER.

Application filed November 24, 1926. Serial No. 150,534.

My invention relates to automatic switching means for controlling the charging of storage batteries.

The object of the invention is to provide a simple and inexpensive device for automatically controlling the charging of storage batteries which are used to energize thermionic tube radio apparatus, whereby the batteries are kept in a charged condition.

The invention will be better understood by reference to the drawing and accompanying description of a preferred embodiment of my device.

In the figure, reference numeral 1 indicates a radio frequency amplifier tube, 2 a similar tube, 3 a detector tube, 4 and 5 audio frequency amplifier tubes. Tube 1 is coupled to an antenna and ground system by means of a tuned transformer 6, while tubes 2, 3, 4 and 5 are interconnected by transformers 7, 8, 9 and 10, respectively. The output of tube 5 is passed to a loud speaker or similar device indicated by numeral 38. 39 is a filament controlling switch.

These elements comprise a conventional radio receiving set and form no part of my invention.

The filaments 11, 12, 13, 14, 15, and the plates 16, 17, 18, 19, 20 of the several tubes are supplied in the usual manner by means of batteries 21 and 22, which in this system are of the storage type.

My invention lies in the provision of a particular switching means whereby these batteries are kept in a charged condition. This means comprises, for the filament battery, a source of charging current indicated at 25 as alternating current, a transformer 40 for obtaining the correct charging potential, rectifier 23, and circuit-controlling elements 26, 28, 29, 30, 31 and 32. The plate battery is supplied by similar means including line 25 and elements 41, 24, 33, 34, 35, 36 and 37.

The operation of the system is as follows. With the filament battery 21 in a discharged condition the magnetism of core 29, due to the battery current flowing through winding 31, is insufficient to separate the contacts 28 against the tension of spring 32. The line current is therefore supplied through contacts 28 and transformer 40 to rectifier 23, and thence to the battery 21.

When the battery 21 becomes fully charged its increased potential causes more current to pass through winding 31, which then magnetizes core 29 sufficiently to separate contacts 28, thereby breaking the battery-charging circuit and preventing further charging of the battery.

It is desirable, as the battery is used to supply a load circuit in the form of a radio receiver of the thermionic tube type, that the battery be disconnected from the charging source during the interval of time that the receiver is in use, in order that no charging line disturbances shall be transmitted to the receiver.

This is accomplished by providing a winding 26 in series with the battery and filament or load circuit. When the load circuit is closed through switch 39, current passes through winding 26, thus causing it to aid winding 31 in the magnetization of core 29 sufficiently to separate contacts 28 and thus break the battery charging circuit. If the battery should happen to be fully charged, the contacts 28 would be open anyway, and so the passage of current through winding 26 would have no effect.

The shunt winding 31 is of comparatively high resistance so that it draws but a negligible current from the battery 21. If the battery discharges itself for any reason, the potential across its terminals falls so that the current through winding 31 is insufficient to keep contacts 28 separated, hence they close and place the battery on charge again.

The charging of battery 22 is accomplished in the same manner by duplicate apparatus. Charging current is supplied from line 25 through transformer 41 and rectifier 24, to battery 22. The charging is automatically regulated by contacts 36, which are controlled by spring 37 and magnetized core 33, which is in turn energized by means of the two windings 34 and 35. It will be apparent that when the filament circuit is broken by opening switch 39, the plate circuit will likewise be broken as the tubes will then be placed in a non-conducting condition.

In the embodiment illustrated the charging source is represented as an alternating current line, transformer and rectifier. However, the system will obviously work as well with a direct current charging source of proper voltage.

While I have shown but a single specific modification of my invention, I wish to be limited only by the scope of the appended claims.

What is claimed is:

1. In combination, a radio receiver comprising thermionic tubes, a current supply battery for said tubes, a source of charging current for said battery, means responsive to the potential of said battery for connecting the charging source therewith, and means actuated when the radio receiver is taken into use for disabling said last mentioned means.

2. In combination, a radio receiver comprising thermionic tubes, a current supply battery for said tubes, a source of charging current for said battery, an electromagnet having contacts normally connecting said charging source with said battery, means for actuating said magnet to open said contacts while the potential of the battery is at a certain level, and separate means for causing said magnet to open said contact while the radio receiver is in use.

3. In combination, a radio receiver comprising thermionic tubes of the three-electrode type, a filament and a plate current supply battery, a source of charging current for said batteries, means responsive to the potential of each battery for connecting the charging source therewith, and means actuated when the radio receiver is taken into use for disabling said last mentioned means.

4. In combination, a radio receiver comprising thermionic tubes of the three-electrode type, a filament and a plate current supply battery, a source of charging current for said batteries, two electromagnets, each having normally closed contacts in the charging circuit of one of said batteries, means for actuating said magnets to open said contacts while the potential of the associated battery is at a certain level, and separate means for causing said magnet to open said contacts while the radio receiver is in use.

5. In combination, a radio receiver comprising thermionic tubes of the three-electrode type, a filament and a plate current supply battery for said tubes, an alternating current line, two transformers, parallel connections from the primary windings of said transformers to said line, a rectifier connected with the secondary of each transformer, two electromagnets, each having normally closed contacts in the primary circuit of a transformer, a magnetizing and an aiding winding, the aiding winding of one of said magnets being connected in the filament circuit and of the other magnet between said two batteries, a connection from one of said rectifiers to said filament battery, a connection from the other rectifier to said plate battery, the energizing windings of said magnets being connected in shunt of said last mentioned connections, respectively, and a manually operable switch in the filament circuit.

In testimony whereof, I have signed my name to this specification this 17th day of November, 1926.

CARLETON T. WEIBLER.